(12) United States Patent
Hallack et al.

(10) Patent No.: US 11,130,449 B2
(45) Date of Patent: Sep. 28, 2021

(54) MODULAR IMAGER ASSEMBLY

(71) Applicant: Gentex Corporation, Zeeland, MI (US)

(72) Inventors: Jason D. Hallack, Allendale, MI (US); Christopher B. Case, Caledonia, MI (US); Bradley R. Hamlin, Allendale, MI (US)

(73) Assignee: GENTEX CORPORATION, Zeeland, MI (US)

( * ) Notice: Subject to any disclaimer, the term of this patent is extended or adjusted under 35 U.S.C. 154(b) by 267 days.

(21) Appl. No.: 16/169,475

(22) Filed: Oct. 24, 2018

(65) Prior Publication Data

US 2019/0126850 A1 May 2, 2019

Related U.S. Application Data

(60) Provisional application No. 62/577,522, filed on Oct. 26, 2017.

(51) Int. Cl.
| | |
|---|---|
| *B60R 11/04* | (2006.01) |
| *B60Q 1/04* | (2006.01) |
| *B60R 1/078* | (2006.01) |
| *G03B 17/56* | (2021.01) |
| *B60R 11/00* | (2006.01) |

(52) U.S. Cl.
CPC ............ *B60R 11/04* (2013.01); *B60Q 1/0408* (2013.01); *B60R 1/078* (2013.01); *G03B 17/561* (2013.01); *B60R 2011/0026* (2013.01)

(58) Field of Classification Search
None
See application file for complete search history.

(56) References Cited

U.S. PATENT DOCUMENTS

| | | | |
|---|---|---|---|
| 6,806,452 B2 | 10/2004 | Bos et al. | |
| 7,526,103 B2 * | 4/2009 | Schofield | G06K 9/00818 382/104 |
| 7,630,803 B2 | 12/2009 | Stam et al. | |
| 8,836,888 B2 | 9/2014 | Minikey, Jr. et al. | |
| 9,199,574 B2 | 12/2015 | Pierce et al. | |
| 10,154,200 B2 | 12/2018 | Rycenga et al. | |
| 2002/0040962 A1 | 4/2002 | Schofield et al. | |
| 2014/0055617 A1 | 2/2014 | Minikey, Jr. et al. | |
| 2014/0226012 A1 * | 8/2014 | Achenbach | B60R 11/04 348/148 |
| 2017/0272624 A1 | 9/2017 | Minikey, Jr. et al. | |
| 2017/0272633 A1 | 9/2017 | Minikey, Jr. et al. | |
| 2018/0091779 A1 | 3/2018 | Hendricks | |

* cited by examiner

*Primary Examiner* — Jennifer D. Carruth
(74) *Attorney, Agent, or Firm* — Price Heneveld LLP; Bradley D. Johnson (57) ABSTRACT

A modular imager assembly includes a housing configured for removable attachment to a vehicle windscreen and for removable attachment with a rearview assembly. An imager is disposed within the housing and is in optical communication with an aperture extending into the housing. A controller is disposed within the housing and is operably coupled with the imager and a vehicle headlamp. The controller is operable to control an operation state of the vehicle headlamp in response to image data received by the imager.

20 Claims, 6 Drawing Sheets

MODULAR IMAGER ASSEMBLY

CROSS-REFERENCE TO RELATED APPLICATION

This application claims priority to and the benefit under 35 U.S.C. § 119(e) of U.S. Provisional Application No. 62/577,522, filed on Oct. 26, 2017, entitled "MODULAR IMAGER ASSEMBLY," the disclosure of which is hereby incorporated herein by reference in its entirety.

FIELD OF THE DISCLOSURE

The present disclosure generally relates to an imager assembly, and more particularly to a modular imager assembly.

SUMMARY OF THE DISCLOSURE

According to one aspect of the present disclosure, a modular imager assembly includes a mount having an interface configured to engage a windscreen button that is operably coupled with a vehicle windscreen. A housing is configured for removable attachment to the mount and for removable attachment with a rearview assembly. An imager is disposed within the housing and is in optical communication with an aperture extending into the housing. A controller is disposed within the housing and is operably coupled with the imager and a vehicle headlamp. The controller is operable to control an operation state of the vehicle headlamp in response to image data received by the imager.

According to another aspect of the present disclosure, a modular imager assembly includes a housing configured for removable attachment to a vehicle windscreen and for removable attachment with a rearview assembly. An imager is disposed within the housing and is in optical communication with an aperture defined through the housing. A controller is disposed within the housing and is operably coupled with the imager and an adjustable vehicle component. The controller is operable to control an operation state of the adjustable vehicle component in response to image data received by the imager.

According to yet another aspect of the present disclosure, a modular imager assembly includes a housing configured for removable attachment to a vehicle windscreen and for removable attachment with a rearview assembly. An imager is disposed within the housing and is in optical communication with an aperture defined through the housing. A controller includes an internal frame supporting at least one of a first circuit board and a second circuit board. The controller is disposed within the housing and is in communication with the imager and a vehicle headlamp. The controller is operable to control an operation state of the vehicle headlamp in response to image data received by the imager. The modular imager assembly is configured for removable installation proximate the rearview assembly without interfering with the performance of the modular imager assembly.

These and other features, advantages, and objects of the present disclosure will be further understood and appreciated by those skilled in the art by reference to the following specification, claims, and appended drawings.

DETAILED DESCRIPTION

The present illustrated embodiments reside primarily in combinations of method steps and apparatus components related to an imager. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
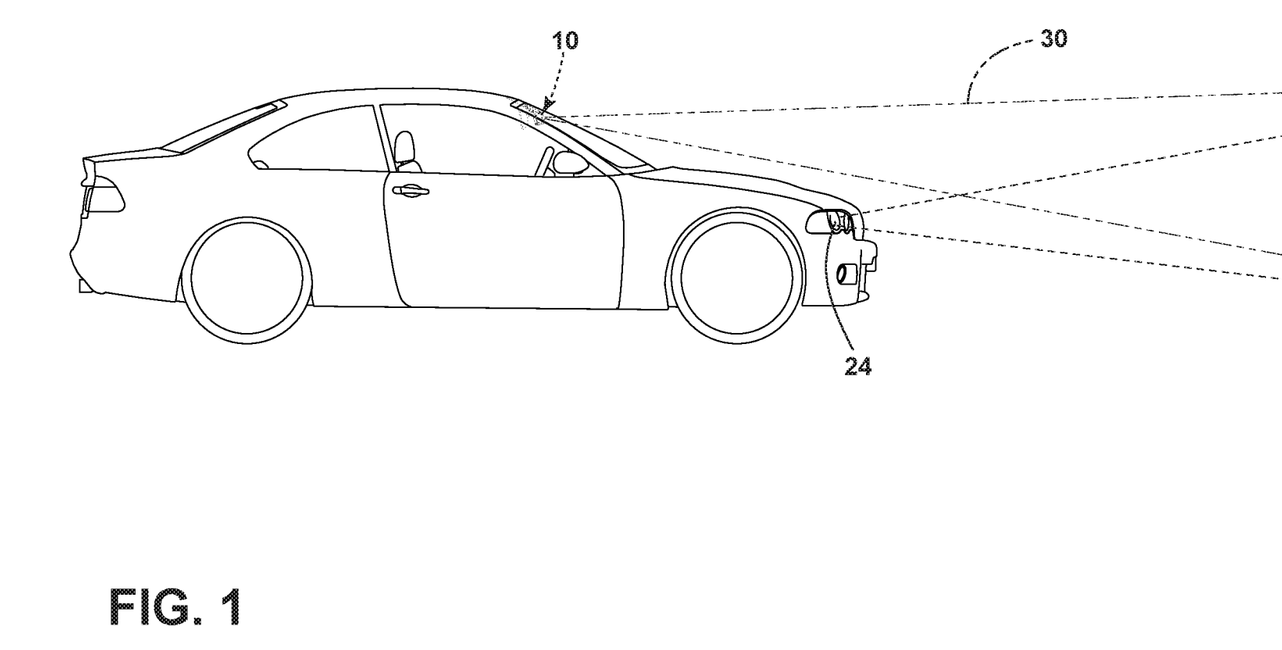
FIG. 1 is a side elevational view of a vehicle with a modular imager assembly of the present disclosure disposed therein.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-6, reference numeral 10 generally designates a modular imager assembly, in the form of a modular imager system or headlamp autodimming system, that includes a housing 12 configured for removable attachment to a vehicle windscreen 14 and for removable attachment with a rearview assembly 16. An imager 18 is disposed within the housing 12 and is in optical communication with an aperture 20 extending into the housing 12. A controller 22 is disposed within the housing 12 and is operably coupled with the imager 18 and a vehicle headlamp 24. The controller 22 is operable to control the vehicle headlamp 24 in response to image data received by the imager 18.

Figure 2A:
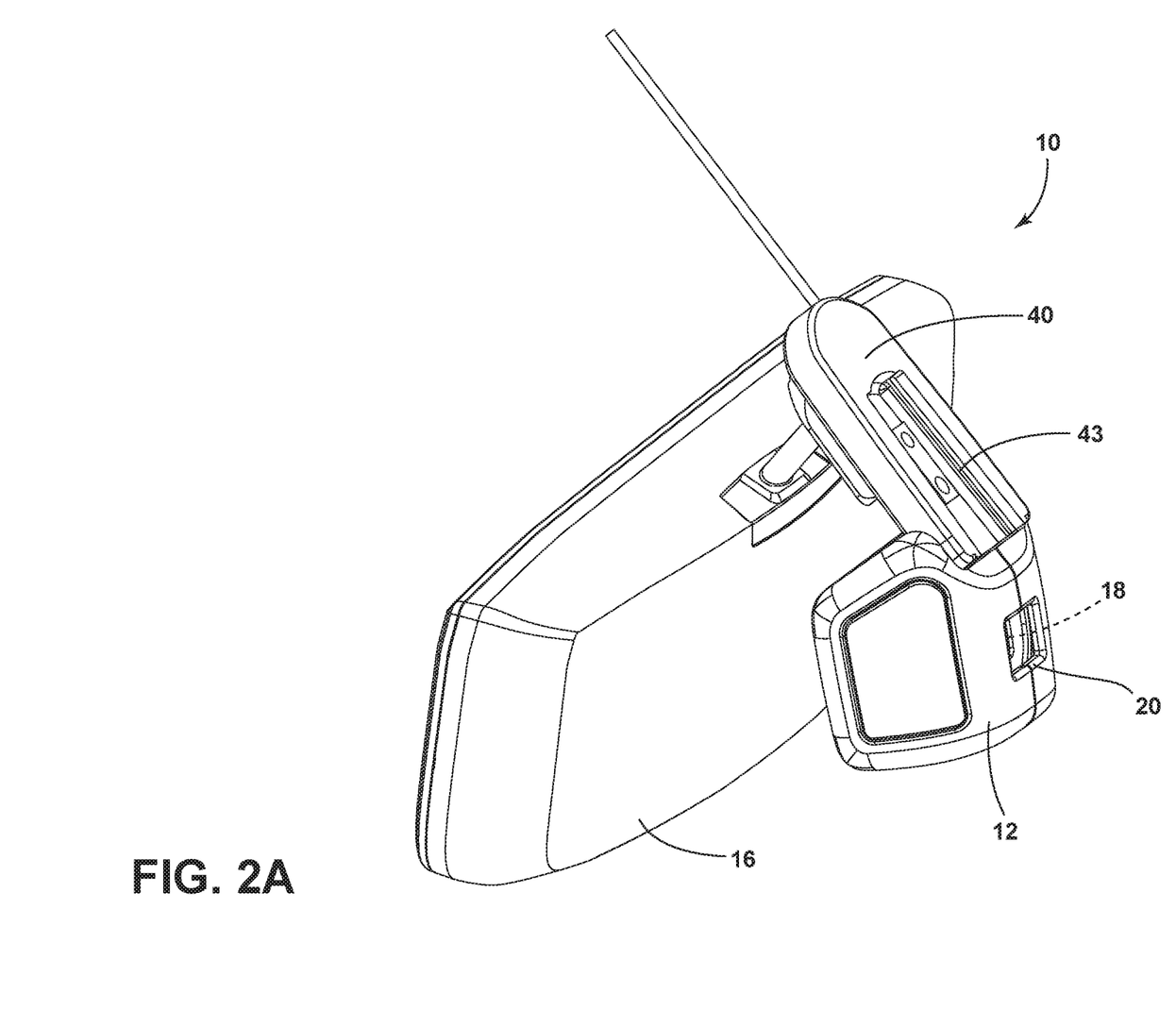
FIG. 2A is a front perspective view of a modular imager assembly of the present disclosure.
Figure 2B:
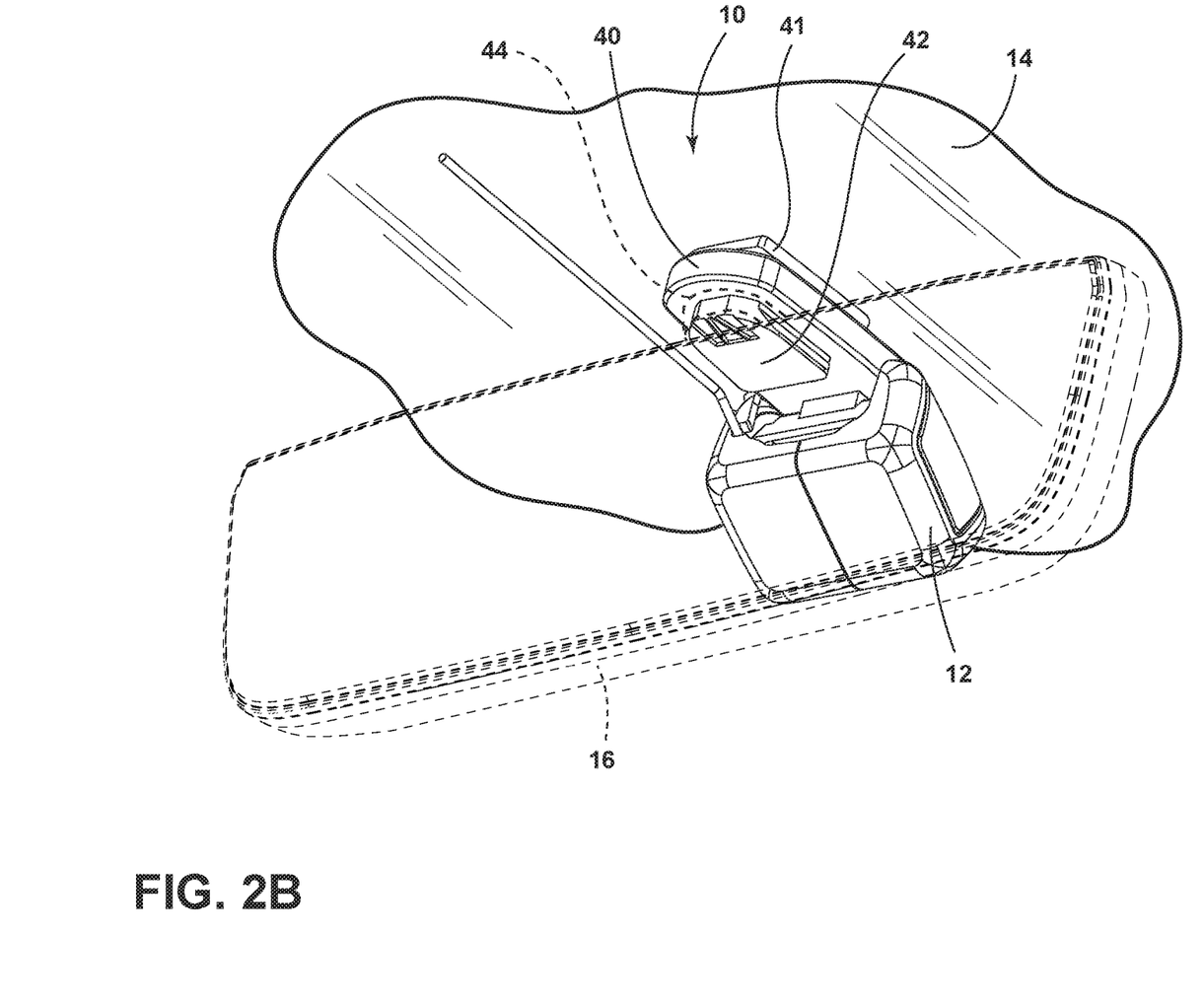
FIG. 2B is a rear perspective view of the modular imager assembly of FIG. 2A with a mount engaging a windscreen button.

With reference now to FIGS. 1, 2A, and 2B, the modular imager assembly 10 is configured for use with a vehicle and can be used for detecting headlights of an oncoming vehicle and taillights of a preceding vehicle. The headlamps 24 of the controlled vehicle are controlled automatically to avoid operating the headlamps 24 in a high beam operating state that could be directed into the eyes of a driver of an oncoming vehicle, or by reflection into the eyes of the driver of a preceding vehicle. As illustrated, the modular imager assembly 10 includes the imager 18, which generally defines an optical sensor assembly mounted proximate the windscreen 14 of the vehicle. In this location, the imager 18 has a field of view 30 of a scene forward of the vehicle. It will be understood that the modular imager assembly 10 may be disposed at any position proximate the windscreen 14 that provides a clear view of a forward area of the vehicle. In some instances, for a vehicle that does not include an autodimming feature for headlights of the vehicle, it may be advantageous to add the modular imager assembly 10 to the vehicle. Traditional aftermarket assemblies can provide bulky and costly add-ons to the vehicle. The modular imager assembly 10 disclosed herein is configured to be added to the rearview assembly 16 without affecting, or otherwise negatively impacting, the operation and use of the rearview assembly 16. As set forth herein, the modular imager assembly 10 can be applied to a vehicle with relative ease and minimal cost.

Figure 3:
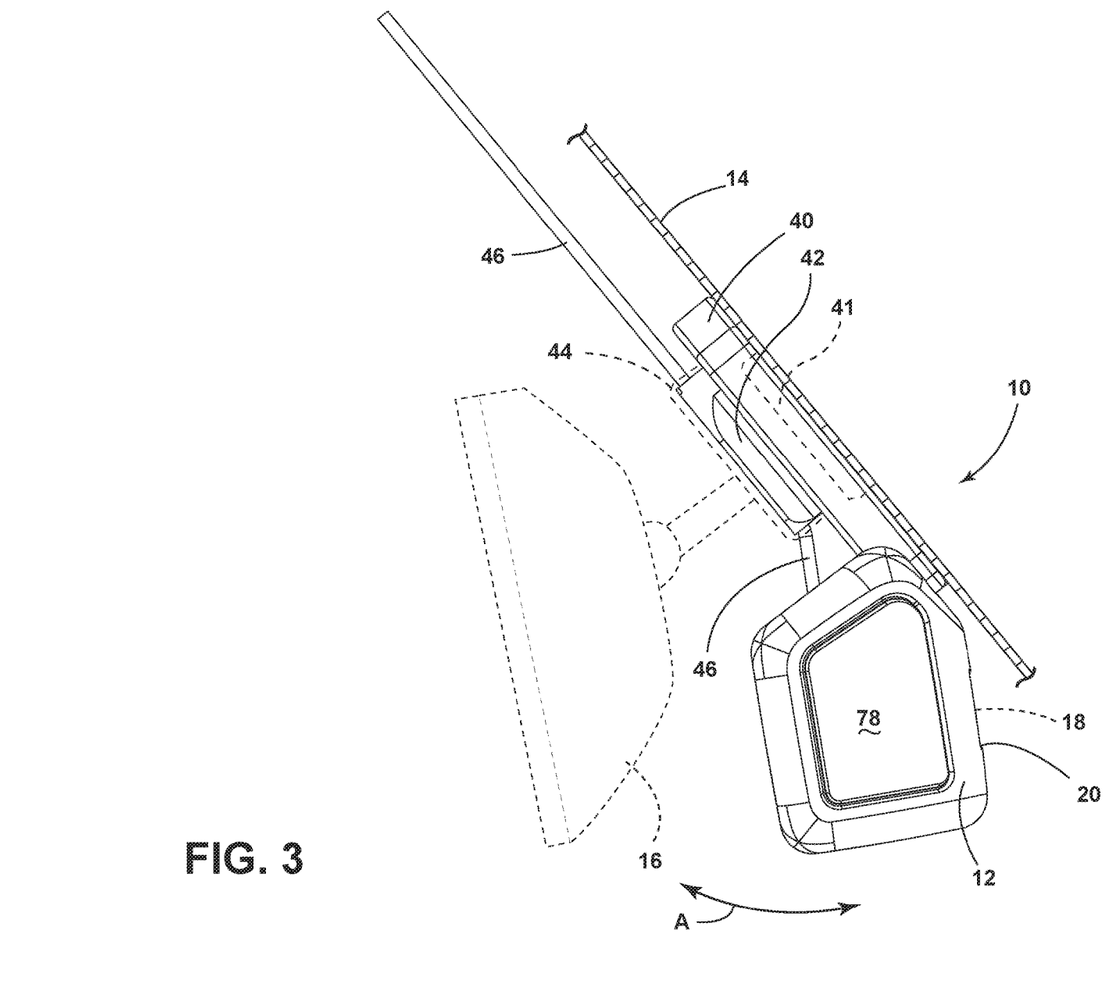
FIG. 3 is a side perspective view of a modular imager assembly of the present disclosure.
Figure 4:
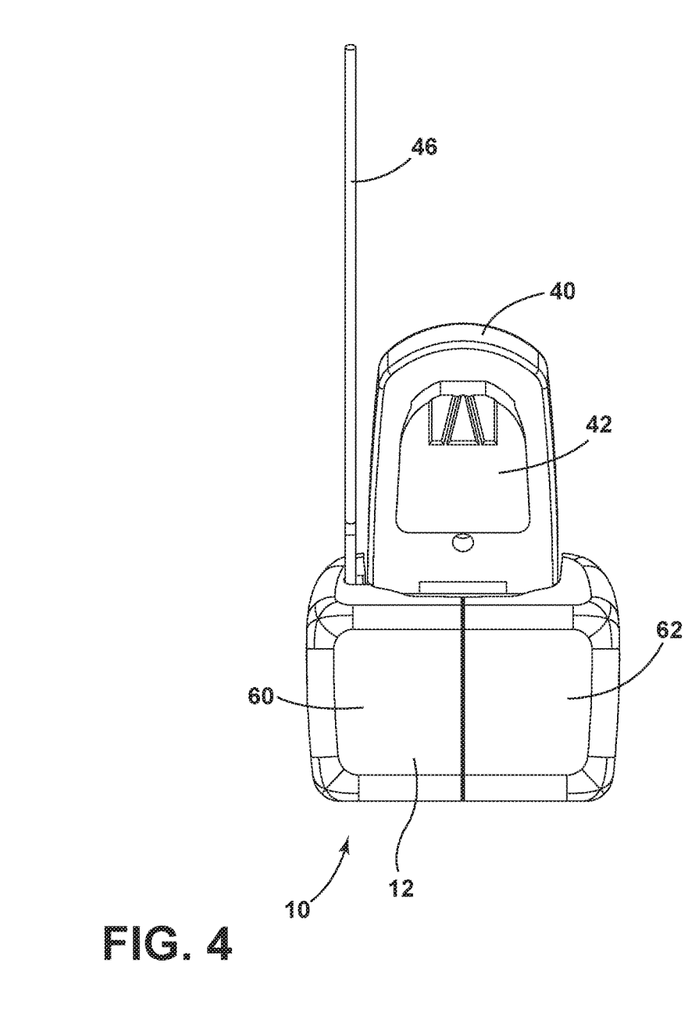
FIG. 4 is a bottom plan view of the modular imager assembly of FIG. 3.
Figure 5:
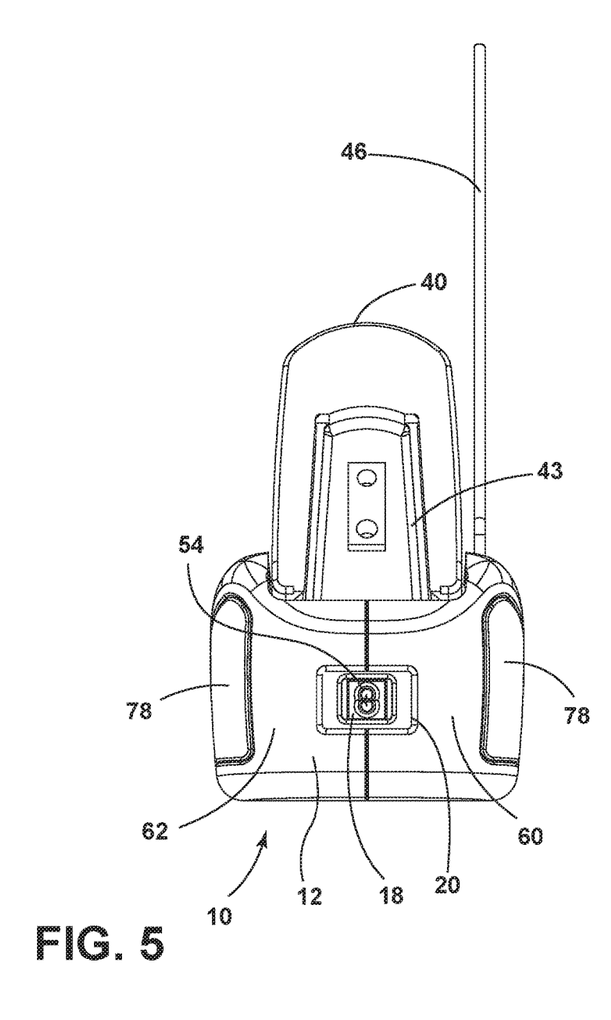
FIG. 5 is a top plan view of the modular imager assembly of FIG. 3.

With reference now to FIGS. 3-5, the modular imager assembly 10, and specifically, the housing 12 of the modular imager assembly 10, is operably coupled with a mount 40 that engages a windscreen button 41, and which also supports the rearview assembly 16. It will be understood that the housing 12 may be pivotally or fixedly coupled with the mount 40. Regardless, the housing 12, and specifically, the aperture 20, will have a generally forward view of the vehicle so that the imager 18 can capture image data through the windscreen 14 while the modular imager assembly 10 or headlamp autodimming system is in operation. The mount 40 includes a recess 43 (FIGS. 2A and 5) that is configured to engage the windscreen button 41 disposed on the windscreen 14. The mount 40 also includes a mount button 42 that protrudes rearward, and which is configured to support the rearview assembly 16. Stated differently, the mount 40 is configured to be positioned between the windscreen button 41 and a rearview assembly connector 44 of the rearview assembly 16. Although a slide-on button arrangement is illustrated, it will be understood that the recess 43 can be configured to engage any style of windscreen button. Further, the mount button 42 can be configured to engage any style of rearview assembly connector 44. The illustrated construction is exemplary. It is generally contemplated that the rearview assembly 16 may hide, or otherwise conceal from view, the modular imager assembly 10 or headlamp autodimming system, and consequently, minimally affect the forward view of the driver of the vehicle. The mount 40 includes a wire harness 46 that is routed upwardly away from the mount 40 and away from the housing 12 and the modular imager assembly 10 or headlamp autodimming system. The wire harness 46 may extend into a headliner or A-pillar of the vehicle and be routed to a vehicle bus that is ultimately coupled with the headlamps 24 of the vehicle. As a result, the modular imager assembly 10 or headlamp autodimming system is operably coupled indirectly with the headlamps 24 of the vehicle. Accordingly, a recommendation can be made to the vehicle to activate or deactivate a high beam condition of the headlamps 24 based on image data received by the imager 18.

With reference again to FIGS. 3-5, it will be understood that the wire harness 46 may be an extension of the vehicle that is plugged into the modular imager assembly 10 or headlamp autodimming system, or the wire harness 46 may be an integral part of the modular imager assembly 10 or headlamp autodimming system that is connected with wiring disposed in the headliner, A-pillar, etc. of the vehicle. The imager 18 may include a variety of different optical systems 66 that direct light onto a sensor 50 of the imager 18. The sensor 50 may include an array of light-sensitive components and associated circuitry to output electronic pixel light level signals responsive to light impacting on the surface of the sensor 50. The optical system 66 may include a housing lens 52 and an imager lens 54 that help direct light toward the center of the imager 18. Other components, including baffles and filters, such as infrared filters, may also be utilized by the imager 18. In general, the optical systems 66 are configured to focus light rays generated by a headlight of an oncoming vehicle or a taillight of a preceding vehicle through an opening of a baffle onto an array contained within the imager 18.

Figure 6:
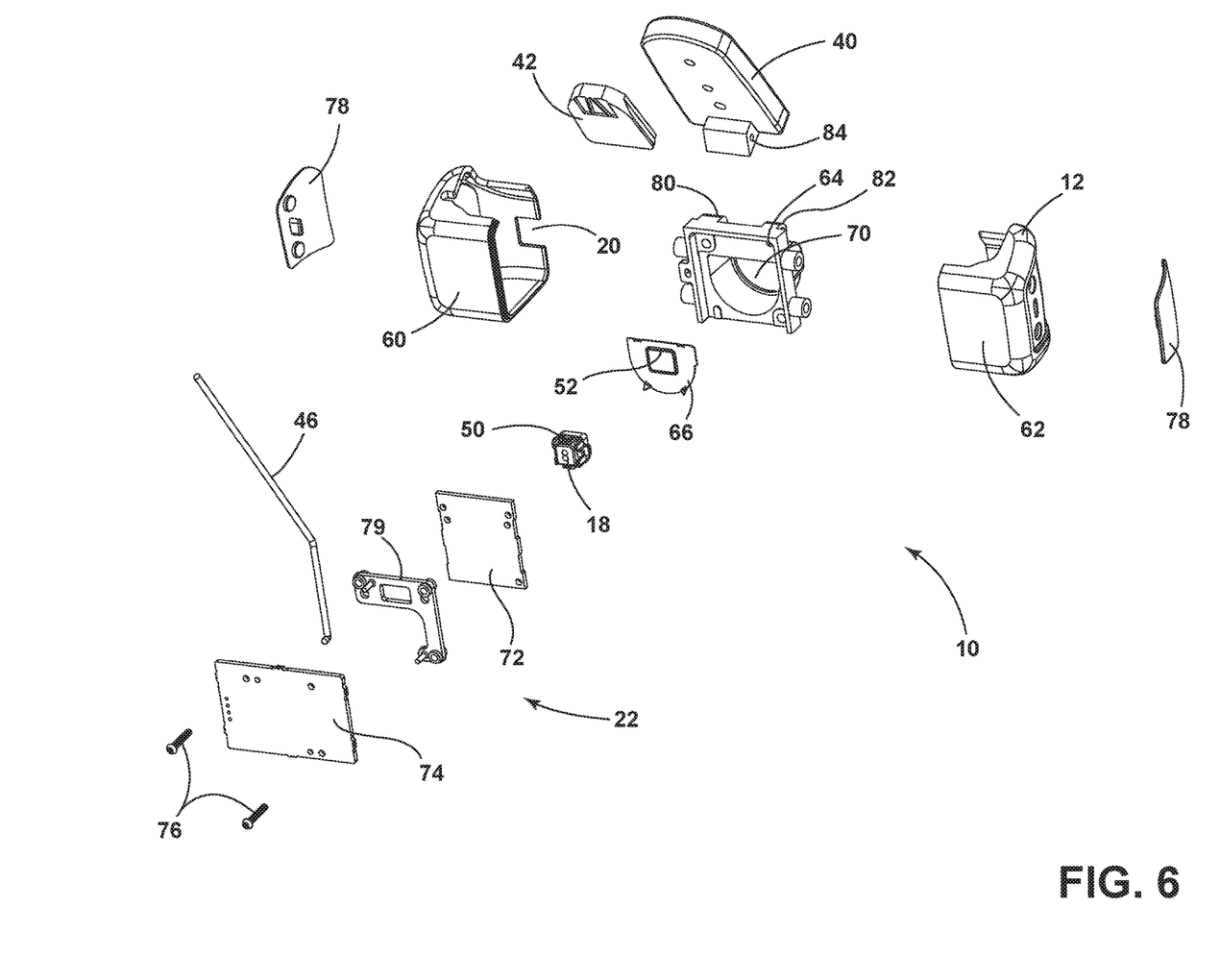
FIG. 6 is an exploded front perspective view of a modular imager assembly of the present disclosure.

With reference now to FIG. 6, the modular imager assembly 10 or headlamp autodimming system is illustrated in an exploded view. The housing 12 includes first and second portions 60, 62 that may be snap-fit or otherwise fastened together around an internal frame 64. The internal frame 64 receives the optical system 66 as well as the imager 18. The optical system 66 and the imager 18 are disposed within a cavity 70 defined by the internal frame 64. The imager 18 is operably coupled with the controller 22, which may include a first circuit board 72, which is operably coupled with a second circuit board 74 by mechanical fasteners 76. The first circuit board 72 and the second circuit board 74 are spaced apart from one another by an internal support bracket 79. The first circuit board 72, the internal support bracket 79, and the second circuit board 74 are secured to the internal frame 64 by the mechanical fasteners 76. In addition, the second circuit board 74 is operably coupled with the wire harness 46 that is operably coupled with the vehicle. Each side of the first and second portions 60, 62 of the housing 12 include decorative side members 78. In addition, the internal frame 64 of the modular imager assembly 10 or headlamp autodimming system includes projections 80, 82 that are pivotally coupled to a pivot member 84 of the mount 40 such that the modular imager assembly 10 or headlamp autodimming system may be rotated relative to the mount 40 in the directions of arrow A to provide the optimum view forward through the windscreen 14 of the vehicle. Notably, the housing 12 rotates independently from the rearview assembly 16. However, it is also contemplated that the housing 12 could include a linkage to the rearview assembly 16, in which case the rearview assembly 16 and imager 18 may move in unison. The mount button 42 is fixedly coupled with the mount 40 and configured to engage the rearview assembly connector 44 of the rearview assembly 16.

The modular imager assembly 10, as set forth herein, provides an easy and simple manner of adding headlight autodimming functionality to a vehicle that does currently have headlight autodimming functionality with minimal cost. In use, an installer simply removes the existing rearview assembly from the windscreen button on the inside of the vehicle. The modular imager assembly 10 is then removably coupled with the windscreen button 41 and the rearview assembly connector 44 of the rearview assembly 16 is then secured with the mount 40 of the modular imager assembly 10. The rearview assembly 16 is displaced from the windshield a predetermined small distance, as the mount 40 is inserted between the windscreen button 41 and the rearview assembly 16. The wire harness 46 of the modular imager assembly 10 is then coupled with the vehicle so that a recommendation can be provided to the vehicle by the modular imager assembly 10 to activate or deactivate the high beams during vehicle use.

The system as described above, is a removable modular imager assembly that can be positioned proximate a windscreen of a vehicle and which can provide imager functionality to a vehicle that otherwise would not include these capabilities. Although, headlight autodimming functionality is described above, it is also contemplated that the imager can be used within the vehicle in conjunction with other adjustable vehicle components. Specifically, the imager could be used in conjunction with vehicle components that adjust or compensate vehicle functions based on vehicle recognition, pedestrian recognition, sign recognition, or object recognition, lane departure warnings, blind spot detection, forward collision warnings, parking assist features, and terrain detection, etc. It will also be understood that the modular imager assembly as set forth herein is configured to be added to a vehicle that otherwise does not include these capabilities, while only minimally affecting or not affecting the functionality of the rearview assembly. By creating a modular imager assembly that has little impact on the functionality of the rearview assembly, the rearview assembly can continue to be operated as it was used prior to installation of the modular imager assembly within the vehicle.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A modular imager assembly comprising:
   a mount having an interface configured to removably engage a windscreen button that is operably coupled with a vehicle windscreen;
   a mount button protruding from the mount, wherein the mount is positioned between the mount button and the windscreen button;
   a housing pivotally and removably attached to the mount;
   an imager disposed within the housing and in optical communication with an aperture defined through the housing; and
   a controller disposed within the housing and operably coupled with the imager and a vehicle headlamp, wherein the controller is operable to control an operation state of the vehicle headlamp in response to image data received by the imager.

2. The modular imager assembly of claim 1, wherein the interface is defined by a recess configured to engage the windscreen button.

3. The modular imager assembly of claim 1, wherein the mount button has a size that is approximately equal to a size of the windscreen button.

4. The modular imager assembly of claim 1, wherein the mount is slidably received onto the windscreen button.

5. The modular imager assembly of claim 1, wherein the housing is pivotally mounted to the mount such that an optimum viewing angle can be provided to the imager.

6. The modular imager assembly of claim 1, further comprising:
   a wire harness that is operably coupled with the housing and with the imager.

7. The modular imager assembly of claim 1, wherein the imager includes an internal support bracket disposed between a first circuit board and a second circuit board inside the housing.

8. A modular imager assembly comprising:
   a mount including a recess that receives a windscreen button to support the mount adjacent to a vehicle windscreen;
   a mount button protruding from the mount, away from the windscreen button, wherein the mount button is removably attached to a rearview assembly;
   an imager housing operably coupled to the mount;
   an imager disposed within the imager housing and in optical communication with an aperture defined through the imager housing; and
   a controller disposed within the imager housing and operably coupled with the imager and an adjustable vehicle component, wherein the controller is operable to control an operation state of the adjustable vehicle component in response to image data received by the imager.

9. The modular imager assembly of claim 8, wherein the windscreen button is operably coupled with the vehicle windscreen and is received by the mount via the recess in the mount.

10. The modular imager assembly of claim 8, wherein the mount button has a size that is approximately equal to a size of the windscreen button.

11. The modular imager assembly of claim 8, further comprising:
   a wire harness in communication with the at least one circuit board and to a headlamp control unit of a vehicle.

12. The modular imager assembly of claim 9, wherein the mount is slidably received onto the windscreen button.

13. The modular imager assembly of claim 8, wherein the imager housing is pivotally mounted to the mount such that an optimum viewing angle can be provided to the imager.

14. The modular imager assembly of claim 8, further comprising:
   a wire harness that is operably coupled with the imager housing and with the imager.

15. The modular imager assembly of claim 8, wherein the imager includes an internal support bracket disposed between a first circuit board and a second circuit board inside the imager housing.

16. A modular imager assembly comprising:
   a housing rotatably coupled with a mount that is configured for removable attachment to a vehicle windscreen button and for removable attachment with a rearview assembly, wherein the mount is disposed directly between the vehicle windscreen button and a mount button supporting the rearview assembly;
   an imager disposed within the housing and in optical communication with an aperture defined through the housing; and
   a controller including an internal frame supporting at least one of a first circuit board and a second circuit board and disposed within the housing, the controller being in communication with the imager and a vehicle headlamp, wherein the controller is operable to control an operation state of the vehicle headlamp in response to image data received by the imager, wherein said modular imager assembly is configured for removable installation proximate the rearview assembly without interfering with performance of said modular imager assembly.

17. The modular imager assembly of claim 16, wherein the housing is pivotally mounted to the mount such that an optimum viewing angle can be provided to the imager.

18. The modular imager assembly of claim 16, further comprising:
   a wire harness that is operably coupled with the housing and with the imager.

19. The modular imager assembly of claim 16, wherein the imager includes an internal support bracket disposed between the first circuit board and the second circuit board inside the housing.

20. The modular imager assembly of claim 16, further comprising:
   a wire harness in communication with the at least one the first circuit board and the second circuit board and to a headlamp control unit of a vehicle.

* * * * *